T. H. MORGAN.
CAR BRAKE MECHANISM.
APPLICATION FILED AUG. 28, 1911.
1,049,386.
Patented Jan. 7, 1913.
3 SHEETS—SHEET 3.
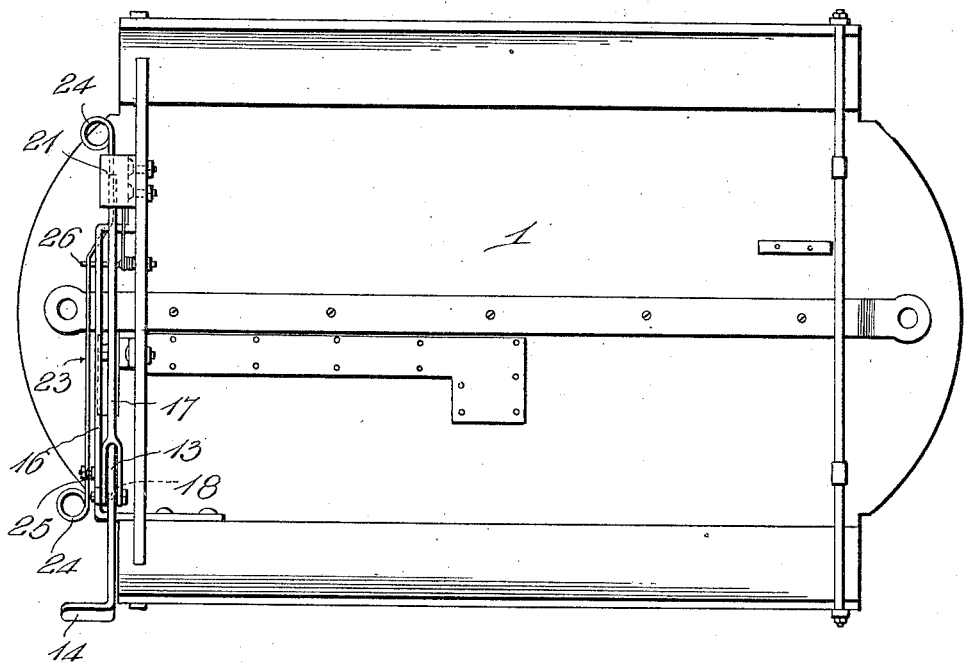
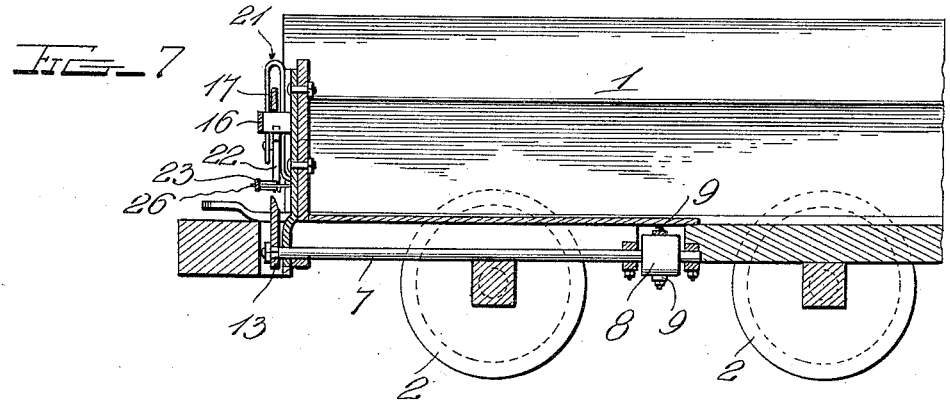
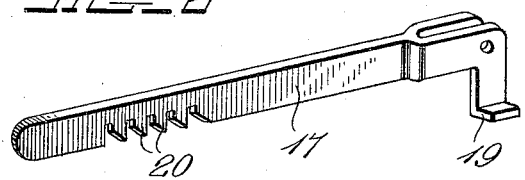
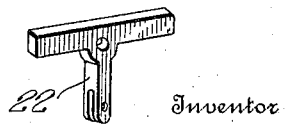
Inventor
Thomas H. Morgan
By Addison G. Du Bois Co
his Attorney
Witnesses

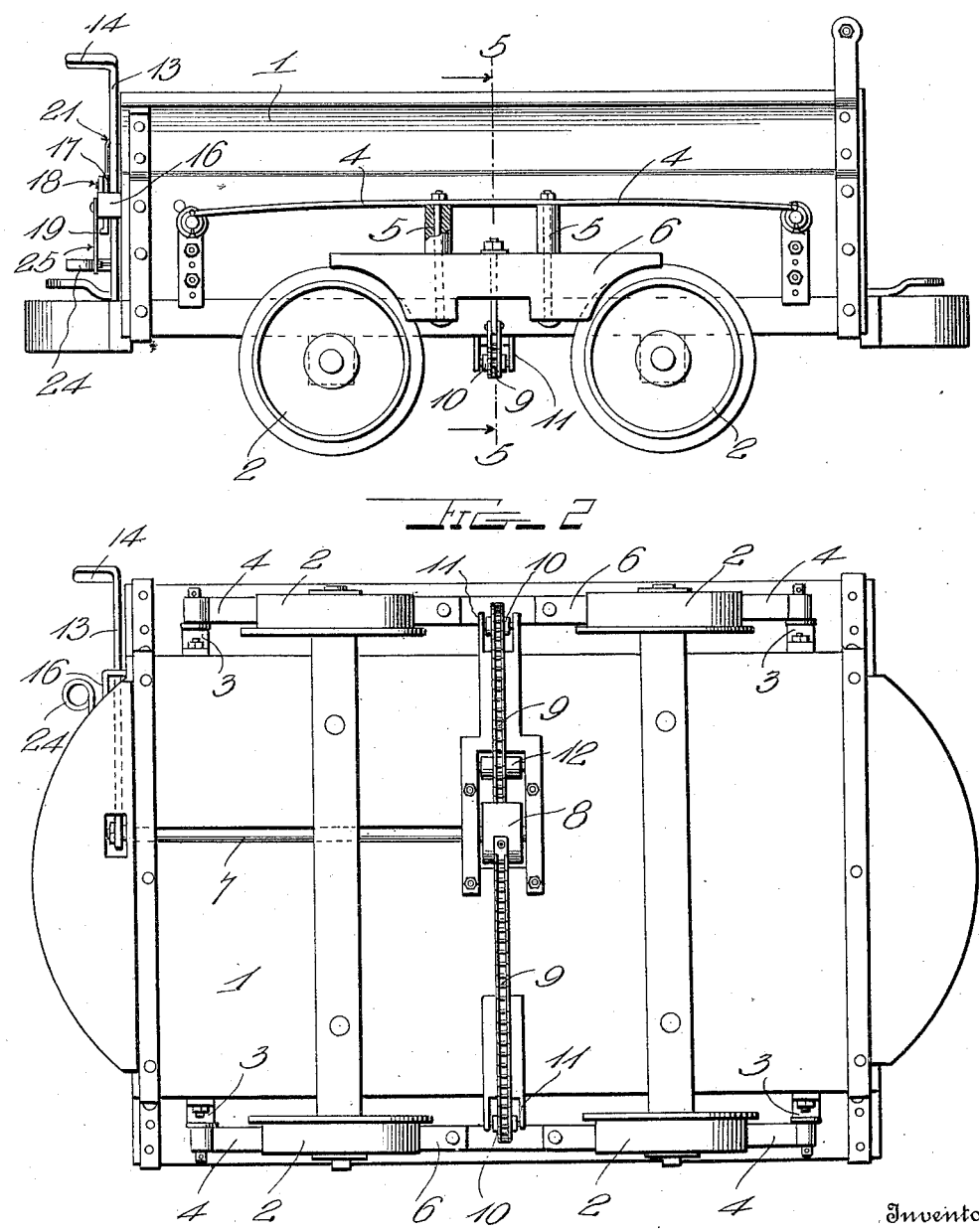

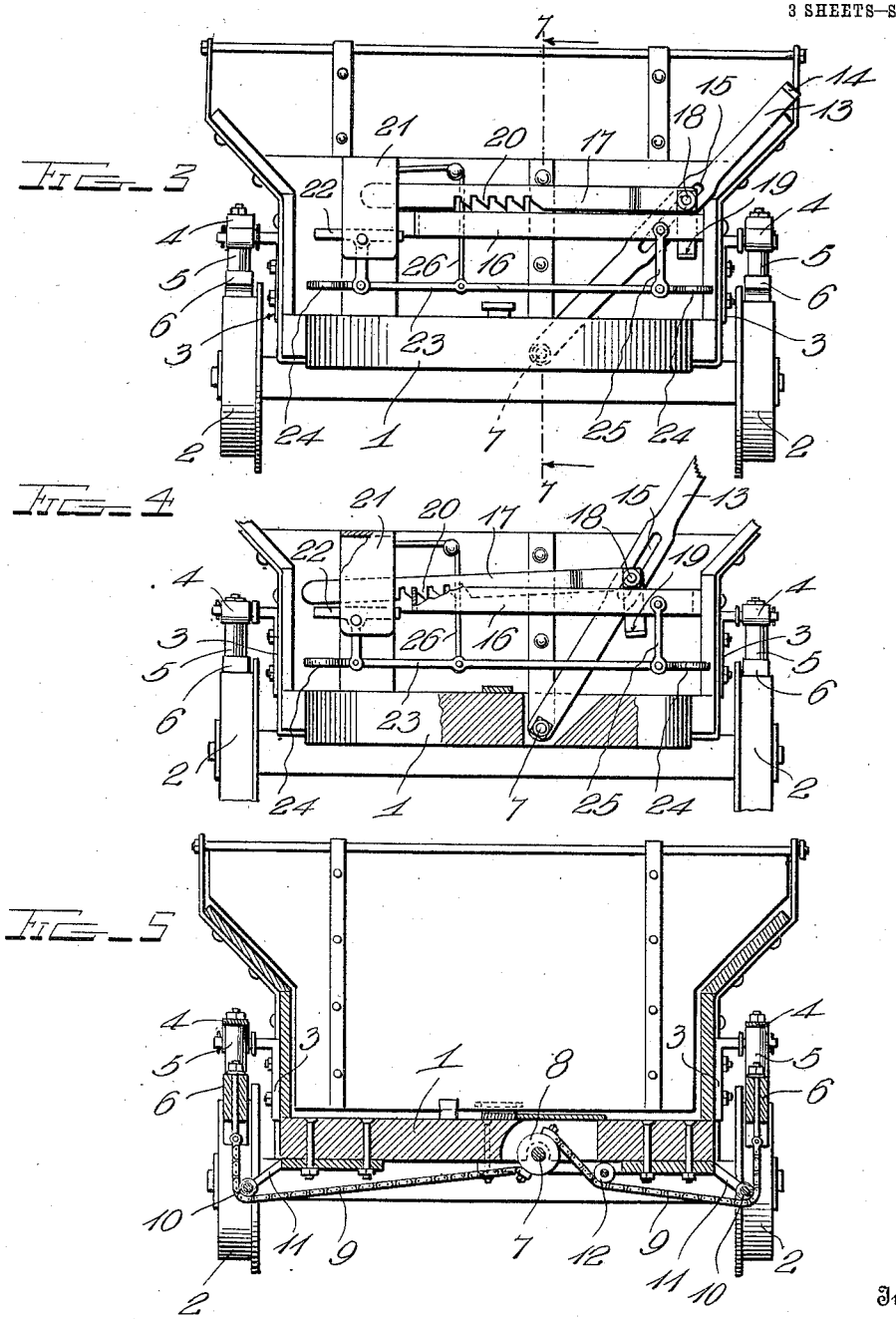

UNITED STATES PATENT OFFICE.

THOMAS H. MORGAN, OF McCARTNEY, PENNSYLVANIA.

CAR-BRAKE MECHANISM.

1,049,386.  Specification of Letters Patent.  Patented Jan. 7, 1913.

Application filed August 28, 1911. Serial No. 646,427.

*To all whom it may concern:*

Be it known that I, THOMAS H. MORGAN, a citizen of the United States, residing at McCartney, in the county of Clearfield and State of Pennsylvania, have invented certain new and useful Improvements in Car-Brake Mechanism, of which the following is a specification.

This invention has relation to car brake mechanisms, and has for its object to provide a simple mechanism adapted to be applied to the end of a car for the purpose of locking the brake shoes in engagement with the peripheries of the supporting wheels of the car. This mechanism may be easily and readily operated by one standing at either side of the car for releasing the brake shoes from engagement with the car wheels.

With this object in view the mechanism includes a shaft journaled for rotation within or below the floor of the car and which is operatively connected with the brake shoes for the purpose of bringing them in engagement with the wheels of the car when the said shaft is partially rotated. An operating lever is fixed to the end portion of the said shaft and is mounted to be swung in a direction transversely of the body of the car. A guide is mounted at the end of the car and the said lever is located between the intermediate portion of the guide and the end of the car. The lever is provided with an elongated slot which loosely receives a pin attached to a latch-bar. Means is carried by the said latch-bar for limiting its lateral movement with relation to the guide and the said latch-bar is provided with a series of teeth which are adapted to engage one end of the guide when the lever is swung so that the brake shoes may temporarily be held in contact with the car wheels. A spring actuated releasing mechanism is mounted at the end of the car and may be operated by one standing at either side of the car for the purpose of disengaging the said latch-bar from the guide so that the parts may assume their normal positions and the brake shoes may move away from the peripheries of the wheels. The supports of the brake shoes are adjustably mounted at the sides of the body of the car so that they may be moved as the said shoes wear, in order to maintain their wearing surfaces at proper distances from the peripheries of the wheels of the car.

In the accompanying drawings:—Figure 1 is a side view of a car with the brake mechanism applied; Fig. 2 is a bottom plan view of the same; Fig. 3 is an end view of the same; Fig. 4 is an end view of the same with parts broken away; Fig. 5 is a transverse sectional view cut on the line 5—5 of Fig. 1; Fig. 6 is a top plan view of the same; Fig. 7 is a vertical longitudinal sectional view of a portion of the same on the line 7—7 of Fig. 3; Fig. 8 is a perspective view of a bar used in the mechanism; and Fig. 9 is a perspective view of a T shaped lever used in the mechanism.

As illustrated in the accompanying drawings the body 1 of the car is mounted upon supporting wheels 2 in any usual or appropriate manner. Brackets 3 are adjustably mounted upon the sides of the body 1 and support elongated flexible strips 4. Hangers 5 depend from the intermediate portions of the strips 4 and support the brake shoes 6. A longitudinally disposed shaft 7 is journaled within or below the bottom of the body 1 and is provided at its innermost end with a drum 8. The inner ends of chains 9 are fixed to the opposite sides of the drum 8 and the intermediate portions of the said chains are trained under pulleys 10 which are journaled in brackets 11 fixed to the bottom of the body and located below the sides thereof. The outer ends of the chains 9 are connected with the brake shoes 6 at points intermediate the ends thereof, by means of adjustable pins as shown in Fig. 1 of the drawing. The intermediate portion of one of the chains 9 is trained under a pulley 12 which is journaled in the vicinity of the drum 8 and from the said pulley 12 the chain 9, which is trained under the same, is carried up and is attached to the upper portion of the periphery of the drum 8.

A lever 13 is fixed to the outer end of the shaft 7 and is provided with an angularly disposed handle grip 14 and an elongated slot 15. An approximately U shaped guide 16 is attached at its ends to the end of the body 1 and the intermediate portion of the said guide 16 receives the intermediate slotted portion of the lever 13. A latch-bar 17 is provided with a pin 18 which is loosely received in the slot 15 of the lever 13. The said latch-bar is approximately L shaped in side elevation and its downwardly disposed end portion is provided with a laterally disposed lug 19 which is located under the lower edge of the intermediate portion of the guide 16. The said lug 19 is adapted to prevent excessive lateral movement of the upper portion of the latch-bar 17 with relation to the guide 16. The latch-bar 17 is provided along its intermediate portion and at its lower edge with a number of teeth 20 which at times are adapted to engage one end of the guide 16 and thereby temporarily hold the brake shoes 6 in contact with the peripheries of the wheels 2. A guide 21 is also fixed to the end of the body 1 and receives that end portion of the latch-bar 17 which is remote from the end thereof which is connected with the lever 13 through the pin and slot connection hereinbefore described. The said latch-bar 17 is slidably received within the guide 21. A T shaped lever 22 is fulcrumed in the guide 21 immediately below the latch-bar 17. The stem of the lever 22 hangs pendent, while the branches of the said lever extend approximately parallel with the latch-bar 17. A rod 23 is pivoted to the lower end of the T shaped lever 22 and extends transversely across the body 1 of the car. The said rod is provided at its ends with handles 24. That portion of the rod 23 which lies under the free end portion of the lever 13 is pivotally connected with the guide 16 by means of a link 25. Thus the said rod 23 may be moved longitudinally, and when it is so moved it will swing the T shaped lever 22 so that the end of one or the other of the branches of the said lever will encounter the lower edge of the latch-bar 17 and lift the same so that its teeth 20 are carried above the upper edge of the guide 16. A spring 26 is fixed to the end of the body 1 and engages the rod 23 and is so tensioned as to hold the rod so that the stem of the T shaped lever 22 will normally hang approximately vertical.

When the brake shoes are to be applied to the peripheries of the wheels 2, an operator grasps the handle 14 of the lever 13 and swings the said lever transversely of the body 1. As this is done the pin and slot connection between the said lever and the latch-bar 17 moves the said bar longitudinally so that the teeth 20 are carried over the upper edge of one end portion of the guide 16. The said latch-bar 17 then gravitates so that the spaces between two of its adjacent teeth receive the edge portion of the said guide 16. At the time that the lever 13 is swung as above indicated, the shaft 7 is partially rotated which carries around with it the drum 8 and thus the inner end portions of the chains 9 are wound upon the said drum, which in turn will bring down the brake shoes 6 against the tension of their supporting strips 4. Thus the said shoes are brought in contact with the peripheries of the wheels 2 and the brakes are applied.

When it is desired to release the brakes, an operator standing upon the platform of the car, or on the ground at either side of the car, moves the rod 23 longitudinally in either of two directions. As the said rod moves it swings the T shaped lever 22 which causes the end of one of its branches to encounter the lower edge of the free end portion of the latch-bar 17 and raise the same so that the teeth 20 are carried above the upper edge of the guide 16. The tension of the flexible strips 4 then comes into play and the shoes 6 are lifted off of the peripheries of the wheels 2. At the same time the chains 9 are moved longitudinally and are unwound from the drum 8, which in turn partially rotates the shaft 7 in a direction opposite to that above indicated. This carries the lever 13 back to its normal position. Thus the cycle of operation of the several parts is completed. As the brake shoes 6 become worn, the brackets 3 are shifted in their positions upon the sides of the body 1 so that proper space may be maintained between the lower edges of the said shoes and the upper portions of the peripheries of the wheels 2.

Having thus described the invention, what is claimed as new is:

1. In combination with a wheel mounted body, resiliently supported brake shoes located thereon, a shaft journaled upon the body, means operatively connecting the shaft with the brake shoes, a slotted lever fixed to the shaft, a guide fixed to the end of the body and receiving said lever, a latch bar having pin and slot connection with the lever and having an end portion projecting over one end of the guide, said latch bar having at its lower edge teeth, and means for moving the latch bar with relation to the guide.

2. In combination with a wheel mounted body having resiliently supported brake shoes located thereon, a shaft journaled upon the body, means operatively connecting the shaft with the brake shoes, a lever fixed to the shaft, a guide fixed to the end of the body and receiving said lever, said lever having an elongated slot, a latch bar having a pin which is loosely received within the said slot, said bar having a lug which lies under the lower edge of the guide, the latch bar having at its lower edge teeth adapted to engage the edge of the guide, and means for moving that end portion of the latch bar which is remote from the lever.

3. In combination with a wheel mounted body having resiliently supported brake shoes, a shaft journaled upon the body, means operatively connecting the shaft with the brake shoes, a lever fixed to the shaft and having an elongated slot, a latch bar having a pin which is received within the said slot, the said latch bar having a lug which is located under the lower edge of the guide, the latch bar having at its lower edge teeth adapted to engage the upper edge portion of the guide, a second guide mounted upon the end of the body and slidably receiving the end portion of the said latch bar, a lever fulcrumed in the second mentioned guide and having a free end portion lying under the free end portion of the latch bar, and means for swinging the last mentioned lever.

4. In combination with a wheel mounted body having resiliently supported brake shoes, a shaft journaled upon the body, means operatively connecting the shaft with the brake shoes, a lever fixed to the said shaft and having an elongated slot, a guide mounted upon the end of the body and receiving said lever, a latch bar having a pin which is received within the slot of the lever, said latch bar having a lug which lies under the lower edge of the guide, said latch bar having its lower edge portion provided with teeth adapted to engage the upper edge portion of the guide, a second guide also mounted upon the end of the body and slidably receiving the free end portion of the latch bar, a T shaped lever fulcrumed in the last mentioned guide and having its branch portions lying under the free end portion of the latch bar, a rod mounted for longitudinal movement at the end of the car and connected with the said T shaped lever, and a return spring operatively engaging said rod.

In testimony whereof I affix my signature in presence of two witnesses.

THOMAS H. MORGAN.

Witnesses:
JNO. B. McGRATH,
ESSIE FILLION.

---

Copies of this patent may be obtained for five cents each, by addressing the "Commissioner of Patents, Washington, D. C."